May 13, 1952 J. H. VAN WAGENINGEN 2,596,624
SUPERHETERODYNE RECEIVING CIRCUIT
Filed July 16, 1946
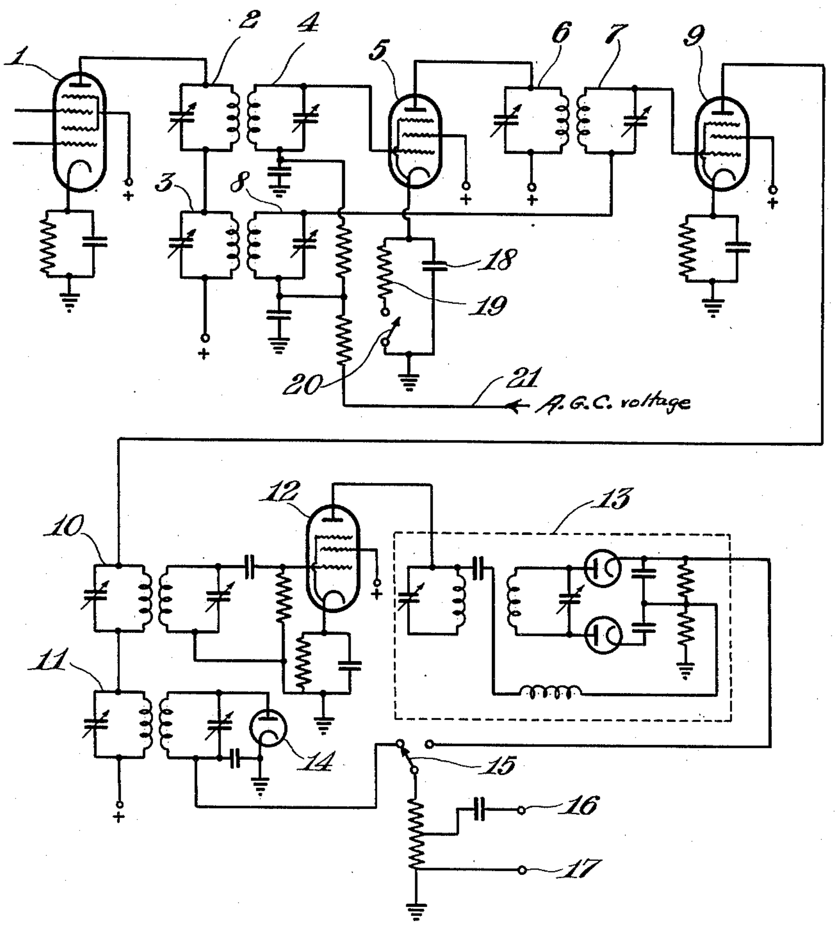
INVENTOR.
JOHAN HENDRIK VAN WAGENINGEN
BY Fred M Vogel
AGENT.

Patented May 13, 1952 2,596,624

UNITED STATES PATENT OFFICE 2,596,624

SUPERHETERODYNE RECEIVING CIRCUIT

Johan Hendrik van Wageningen, Eindhoven, Netherlands, assignor to Hartford National Bank and Trust Company, Hartford, Conn., as trustee Application July 16, 1946, Serial No. 684,033
In the Netherlands April 21, 1943

Section 1, Public Law 690, August 8, 1946
Patent expires April 21, 1963

3 Claims. (Cl. 250—20)

This invention relates to a superheterodyne receiving circuit which is designed both for the reception of broadcasting signals having a comparatively small band width and for the reception of short-wave signals having a comparatively large band width (for example television signals or frequency-modulated signals).

When receiving broadcasting signals the intermediate frequency amplifier must have a small band width in order to achieve the required selectivity.

In this case use will be made of a comparatively low intermediate frequency which is generally chosen in the neighbourhood of 125 kilocycles/sec. or of 450 kilocycles/sec. The use of a higher intermediate frequency is generally undesirable inter alia because in this case satisfactory tracking between the tuning of the oscillatory circuit and that of the preselection circuits can no longer be obtained in a simple manner.

In contradistinction to this, when receiving frequency or phase-modulated signals or television signals the large band width renders it necessary to use a comparatively high intermediate frequency, for example of the order of from 3 to 20 mc./sec.

Generally in the case of a receiver designed for the reception of both kinds of signals the intermediate frequency amplifier should therefore be adapted for the amplification of two different intermediate frequencies. In this case it should be borne in mind that the high-intermediate frequency used in the reception of the short-wave signals is comprised in the band of the broadcasting waves so that for the purpose of avoiding interference it is essential that this high-intermediate frequency should not be transmitted by the intermediate frequency amplifier during the reception of broadcasting waves. This leads to the use of an intermediate frequency amplifier whose connections can be changed and in which several circuits tuned to the low intermediate frequency are replaced, by means of the wave length switch, by circuits tuned to the high intermediate frequency and vice versa when changing over to the short-wave reception. If the said high-intermediate frequency were also used for the reception of the broadcasting waves such a change of connections would nevertheless also be required in order to alter the band width of the intermediate frequency amplifier. A disadvantage of the said change of connections is that the intermediate frequency circuits must be connected to the wave length switch via comparatively long conductors and this results in undue couplings and detunings of these circuits. In addition, the mechanical construction of the required switches becomes highly involved.

The invention has for its object to obviate these disadvantages and for this purpose makes available the fact that when receiving the short-wave signals the amplification per intermediate frequency amplifier stage is generally considerably lower in connection with the large band width than when receiving the broadcasting signals so that it is desirable to use a large number of intermediate-frequency stages when receiving the short-wave signals than when receiving the broadcasting signals.

According to the invention, one or more intermediate-frequency amplifier stages are in use when receiving the broadcasting signals as well as when receiving the short-wave signals, whereas one or more other intermediate-frequency amplifier stages are in use only when receiving the short-wave signals, the change of connections of the intermediate-frequency amplifier when changing-over from the reception of the short-wave signals to the reception of the broadcasting signals being effected exclusively by rendering inoperative the amplifier valve or valves of at least one of the last-mentioned intermediate-frequency amplifier stages.

In order that the invention may be clearly understood and readily carried into effect it will now be described more fully with reference to the acompanying drawing, in which one embodiment is illustrated.

The single figure of the drawing shows the intermediate-frequency part of a wireless receiver designed both for the reception of the normal, amplitude-modulated broadcasting signals and for the reception of frequency or phase-modulated short-wave signals having a wave length of less than 10 meters. When receiving the broadcasting signals use is made of a comparatively low intermediate frequency, for example of 450 kc./sec., whereas for the reception of the short-wave signals a comparatively high intermediate frequency, for example of 10 mc./sec. is used.

The anode circuit of a mixing valve 1 includes an oscillatory circuit 2 tuned to the high intermediate frequency and an oscillatory circuit 3 tuned to the low intermediate frequency. The oscillatory circuit 2 is coupled inductively to an oscillatory circuit 4 which is also tuned to the high intermediate frequency and which is included in the control-grid circuit of an intermediate frequency amplifier valve 5. The anode circuit of the tube 5 includes an oscillatory circuit 6 which is tuned to the high intermediate frequency and which is coupled inductively to a similar oscillatory circuit 7.

The oscillatory circuit 3 is coupled inductively to an oscillatory circuit 8 which is tuned to the low intermediate frequency and which is included, in series with the circuit 7, in the control-grid circuit of an intermediate-frequency amplifier valve 9. The anode circuit of the tube 9 comprises an oscillatory circuit 10 tuned to the high intermediate frequency and an oscillatory circuit 11 tuned to the low intermediate frequency. The circuit 10 is coupled to a similar circuit which is included in the control grid circuit of a tube 12 acting as an amplitude limiter. The anode current of the tube 12 is supplied to a network 13 which acts in known manner as a frequency detector.

The circuit 11 is coupled via a similar circuit to a diode 14 which serves for the detection of the broadcasting signals. A switch 15 coupled to the wavelength changing switch permits of supplying either the output voltage of the network 13 or the output voltage of the diode 14 to the output terminals 16 and 17.

The cathode lead of the intermediate-frequency amplifier 5 includes, in the usual manner, the parallel combination of a condenser 18 and a resistance 19 which serves for generating the required initial control-grid bias. According to the invention, the resistance 19 has mounted in series with it a switch 20 which is coupled to the wavelength changing switch and which permits of the tube 5 being rendered inoperative on changing over from the reception of the short-wave signals to the reception of the broadcasting signals. The transmission of the high intermediate frequency is thus rendered impossible during the reception of the broadcasting signals so that interference is avoided. In contradistinction to this, it will be possible for the intermediate-frequency amplifier to transmit a low intermediate frequency during the reception of the short-wave signals; since, however, in this case the high frequency part of the receiver is tuned to a frequency which differs widely from the low intermediate frequency this cannot lead to interference.

A control voltage for automatic gain control is supplied in the usual manner to the tubes 5 and 9 by way of the conductor 21.

What I claim is:

1. A superheterodyne receiver circuit arrangement, comprising input circuit means for a first signal voltage of a relatively high given central frequency and for a second signal voltage of a relatively low given central frequency, first and second amplifier discharge tubes each having an input electrode system and an output electrode system, first resonant circuit means tuned to the central frequency of said first signal voltage and coupled to said input means and to the input electrode system of said first tube, second resonant circuit means tuned to the central frequency of said first signal voltage and intercoupling the output electrode system of said first tube and the input electrode system of said second tube, third resonant circuit means tuned to the central frequency of said second signal voltage and interconnecting said input means and the input electrode system of said second discharge tube to provide solely a single stage amplifier for said second signal, means coupled to the output electrode system of said second discharge tube to demodulate said signal voltages, and means to selectively render said first tube inoperative when receiving said second signal voltage.

2. A superheterodyne receiver circuit arrangement, comprising input circuit means for a first signal voltage of a first given central frequency and for a second signal voltage of a second given central frequency lower than said first given central frequency, first and second amplifier discharge tubes each having an input electrode system and an output electrode system, first resonant circuit means tuned to the central frequency of said first signal voltage and coupled to said input means and to the input electrode system of said first tube, second resonant circuit means tuned to the central frequency of said first signal voltage and intercoupling the output electrode system of said first tube and the input electrode system of said second tube, third resonant circuit means tuned to the central frequency of said second signal voltage and interconnecting said input means and the input electrode system of said second discharge tube to provide solely a single stage amplifier for said second signal, means coupled to the output electrode system of said second discharge tube to demodulate said signal voltages, and switch means included in one of the electrode systems of said first tube to selectively render said first tube inoperative when receiving said second signal voltage.

3. A superheterodyne receiver circuit arrangement for receiving a first signal voltage of a first given central frequency and a second signal voltage of a second given central frequency lower than said first given central frequency, comprising first and second amplifier discharge tubes each having an input electrode system and an output electrode system, first and second oscillatory circuits tuned to said first and second central frequencies respectively, means to apply said first signal voltage to said first oscillatory circuit and said second signal voltage to said second oscillatory circuit, means to couple said first oscillatory circuit to the input electrode system of said first tube, a third oscillatory circuit tuned to said first central frequency and coupled to the output electrode system of the said first tube, a fourth oscillatory circuit tuned to said first central frequency and coupled to said third oscillatory circuit and to the input electrode system of said second tube, a fifth oscillatory circuit tuned to said second central frequency and coupled to said second oscillatory circuit, means to couple said fourth and fifth oscillatory circuits in series to apply said second signal voltage to the input electrode system of said second tube, sixth and seventh oscillatory circuits tuned to said first and second central frequencies respectively and coupled to the output electrode system of said second tube, means coupled to said sixth oscillatory circuit to demodulate said first signal voltage, means coupled to said seventh oscillatory circuit to demodulate said second signal voltage, and switch means to selectively render said first tube inoperative when receiving said second signal voltage.

JOHAN HENDRIK VAN WAGENINGEN.

REFERENCES CITED

The following references are of record in the file of this patent:

UNITED STATES PATENTS

| Number | Name | Date |
|---|---|---|
| Re. 21,473 | George | June 4, 1940 |
| 1,472,218 | Hammond | Oct. 30, 1923 |
| 2,024,614 | Terry | Dec. 17, 1935 |
| 2,031,465 | Cottrell | Feb. 18, 1936 |
| 2,165,794 | Holmes | July 11, 1939 |
| 2,301,504 | Batchelor | Nov. 10, 1942 |